March 27, 1962 F. A. HILL ET AL 3,027,468

PULSE GENERATOR USING DELAY LINES

Filed Oct. 15, 1958 2 Sheets-Sheet 1

INVENTOR.
FRANK A. HILL
A. J. PANKRATZ

BY

ATTORNEY

INVENTOR.
FRANK A. HILL
A. J. PANKRATZ
BY [signature]
ATTORNEY 3,027,468

PULSE GENERATOR USING DELAY LINES

Frank A. Hill, Van Nuys, and A. J. Pankratz, La Canada, Calif., assignors to General Precision, Inc., a corporation of Delaware Filed Oct. 15, 1958, Ser. No. 767,337
6 Claims. (Cl. 307—88.5)

Figure 1:
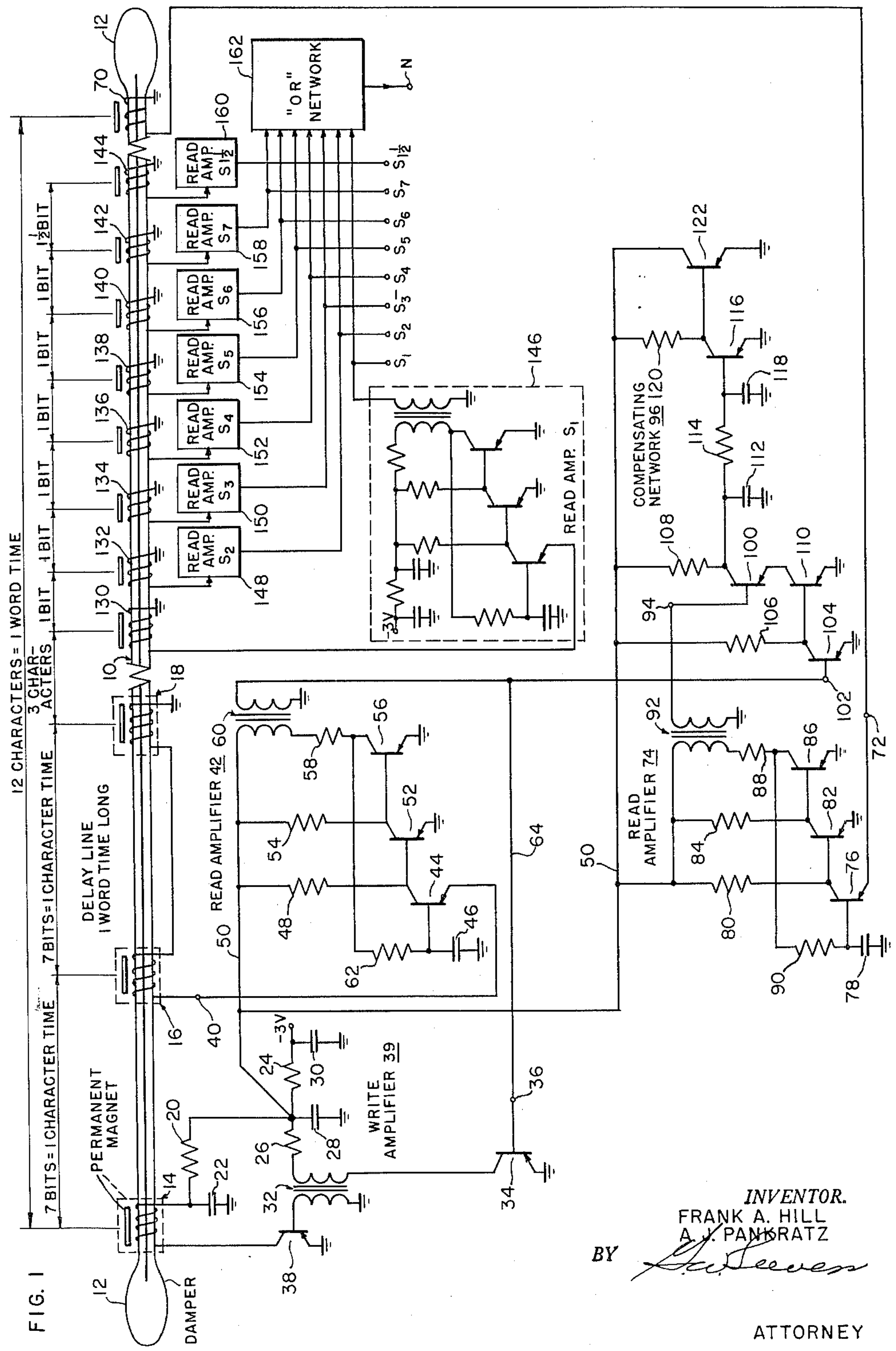

The present invention relates to a system for generating precisely timed electric impulses which are suitable for controlling the operation of a digital electronic computer, or other electronic equipment.

It is important in present-day digital computers that each and every operation in the computer be precisely timed to occur in its proper sequence and at its proper time. Since the different operations of the computer usually occur in time intervals of the order of a millionth of a second, or even less, it is apparent that the timing control must be extremely precise and accurate.

The basic timing of the comunter is under the control of an instrumentality which is generally termed a "clock generator." This clock generator produces a train of clock pulses which recur at a fixed repetition rate. The clock generator must be a precise source of the clock pulses, because the timing variation which can be tolerated in the repetition frequency of these pulses is extremely small. The present invention is concerned with the provision of a clock generator which is extremely precise in its operation, and which is ideally suited for use in electronic digital computers, and the like.

The interval between successive ones of the clock pulses generated by the clock generator in a digital computer is usually referred to as the binary digit or bit time, and it is during each of those intervals that the electric signal corresponding to the data passing through the computer represents the particular binary bit being processed at that particular instant. As is well known, the polarity or amplitude of the electrical signal at any particular digit time indicates that the corresponding binary bit at that time is either a 1 or a 0.

In many serial types of digital computers the digit times are grouped to form characters from a plurality of digit times and to form words from a plurality of character times and to form blocks from a plurality of word times. For example, seven digit times may make up a character time, twelve character times may make up a word time and eight word times may make up a block time. Practically all the transfers and circulations in this computer are made on a serial basis, a binary bit at a time. In the computer each binary bit time is represented by a clock pulse, and logical control circuitry is provided which is timed and synchronized by the clock pulses to control the bit, character, word and block transfers of information.

The present invention provides an extremely accurate clock pulse generator in which timing discrepancies are maintained well within the required tolerances. The embodiment of the invention which is to be described utilizes a delay line assembly to provide the precise time-spacing which is required between successive ones of the generated clock pulses.

The delay line assembly included in that embodiment of the invention may, for example, be of the magnetostrictive type of assembly and may be composed, for example, of a nickel-iron wire. One suitable type of wire is presently being marketed by the Sylvania Corporation and is designated by them as their No. 4 type. Another suitable type of wire is "Ni-SpanC" manufactured by the H. O. Wilson Company.

A write head transducer is supported at one end of the delay line and this head includes a usual coil which surrounds a portion of the delay line. The write head also includes a permanent magnet which is positioned adjacent the coil and extends parallel to the delay line and to the longitudinal axis of the coil. The permanent magnet is longitudinally magnetized, and it functions as a biasing means. Only those pulses flowing through the coil of the write head which have the proper polarity and have sufficient amplitude to overcome the effect of the magnetic field of the permanent magnet are capable of producing compression pulses in the delay line.

The electric pulses introduced to the coil of the write head transducer, and having the appropriate polarity and sufficient amplitude, produce an additional magnetism in the delay line. This causes a pair of compression pulses to be formed in the delay line, and these compression pulses travel in opposite directions along the delay line from the write head.

In one embodiment of the invention the compression pulses are permitted to travel in both directions around the delay line, the delay line being formed into a continuous loop. In a second embodiment of the invention only the compression pulses travelling in one direction along the delay line are used, and the pulses travelling in the opposite direction are damped out.

The delay line assembly also includes one or more read head transducers. Each read head transducer has a coil surrounding the delay line and this coil functions to sense each compression pulse in the delay line as such a pulse passes through the coil. Each read head has a permanent magnet which is associated with it and the read head is able to sense the compression pulse flowing through its coil because of the change of the magnetic flux threading its coil from its associated permanent magnet when the compression pulse passes through the portion of the delay line surrounded by the coil changes.

A difficulty has been encountered, however, in the attempt to provide clock generators utilizing delay lines, even though the delay lines themselves have accurate delay characteristics. The cause for these difficulties has been in the electronics portion of the assembly. That is, even though the delay line characteristics provide delays which are within the required tolerances, the associated electronic circuitry for receiving the output pulses from the read head of the delay line and feeding them back to the write head for circulation through the assembly produces timing errors. These timing errors are such that the accuracy of the clock generator is normally not sufficient for present day digital computer use.

In one embodiment of the invention the tendency of the electronic circuitary to drift and thereby destroy the accuracy of the clock generator is overcome by a unique and improved compensating circuit which compares successive pulses in the delay line to produce a compensating control effect whenever there is a tendency for the timing between such successive pulses to vary. This compensating control effect is exerted on the electronic circuitry to maintain the time interval between successive pulses flowing through the delay line within the required tolerances. In a second embodiment of the invention the successive pulses are, in effect, compared in the read head which receives both pulses. This read head operates to provide a reinforced output pulse whose leading edge is dependent upon the timing of both pulses to maintain the desired accuracy in the system.

The present invention provides, therefore, a relatively simple clock generating system which utilizes a delay line which may be of the magnetostrictive type and which also utilizes associated electronic circuitry to provide for the generation of precisely timed clock pulses. It will be appreciated as the present description proceeds that the system and apparatus of the invention is extremely simple in its construction and yet operates with a high degree of precision which is well within the accepted tolerances required by present-day high-speed electronic digital computers.

A further feature of the clock generator of the embodiments of the present invention to be described is the use of individual read heads spaced along the delay line which serve to generate the output pulses from the generator. These latter read heads are independent of the transducer heads described above which provide for the circulation of the pulses through the system. The latter group of read heads provide output pulses which are timed with respect to one another in accordance with the relative displacement of respective ones of the additional read heads along the delay line. By suitably combining the pulses from the latter group of read heads, any desired number of pulses during the interval of each circulating pulse can be derived, with these latter pulses having any desired timing with respect to one another, as determined by the relative placement of these additional read heads. Also, the use of the independent group of read heads for deriving the output pulses assures that the utilization load circuits will have no effect on the timing of the generator, regardless of the wide variations in load that the utilization circuits may place on the read heads.

In the serial types of computer, such as the one referred to above, in which each character is made up of seven binary bits or digits, the actual delay of the delay line can be made to correspond to one character time, and a clock pulse can be circulated through the delay line once for each character time. However, the clock pulse in addition to being circulated through the delay line, is made to pass through the coils of each of the group of additional read heads which are associated with that portion. Then, the timing of the pulse generated by each head in each character time is dependent upon the particular head of the additional group. These pulses, as mentioned above, may be combined to provide any desired number of pulses during the character time interval, with any desired timing with respect to one another.

For example, in the system under consideration which includes seven binary digit times for each character time, seven additional read heads may be provided to obtain seven pulses from the pulse travelling through the delay line during each character time. These pulses may be timed with respect to one another (by the proper positioning of the additional read heads) so that each pulse from each different read head of the additional group represents a different digit time during the character time. Also, other read heads at other displacements may be included in the additional group to provide other timing indications within the character time.

Other features and advantages of the improved clock generator assembly of the invention will become apparent from a consideration of the following specification in conjunction with the accompanying drawings. It will also become apparent as the description proceeds that the delay line generator of the invention is not limited to its application as a clock generator in an electronic digital computer, but the clock generator of the invention will find utility in any application where a source of precisely timed pulses is required.

Figure 2:
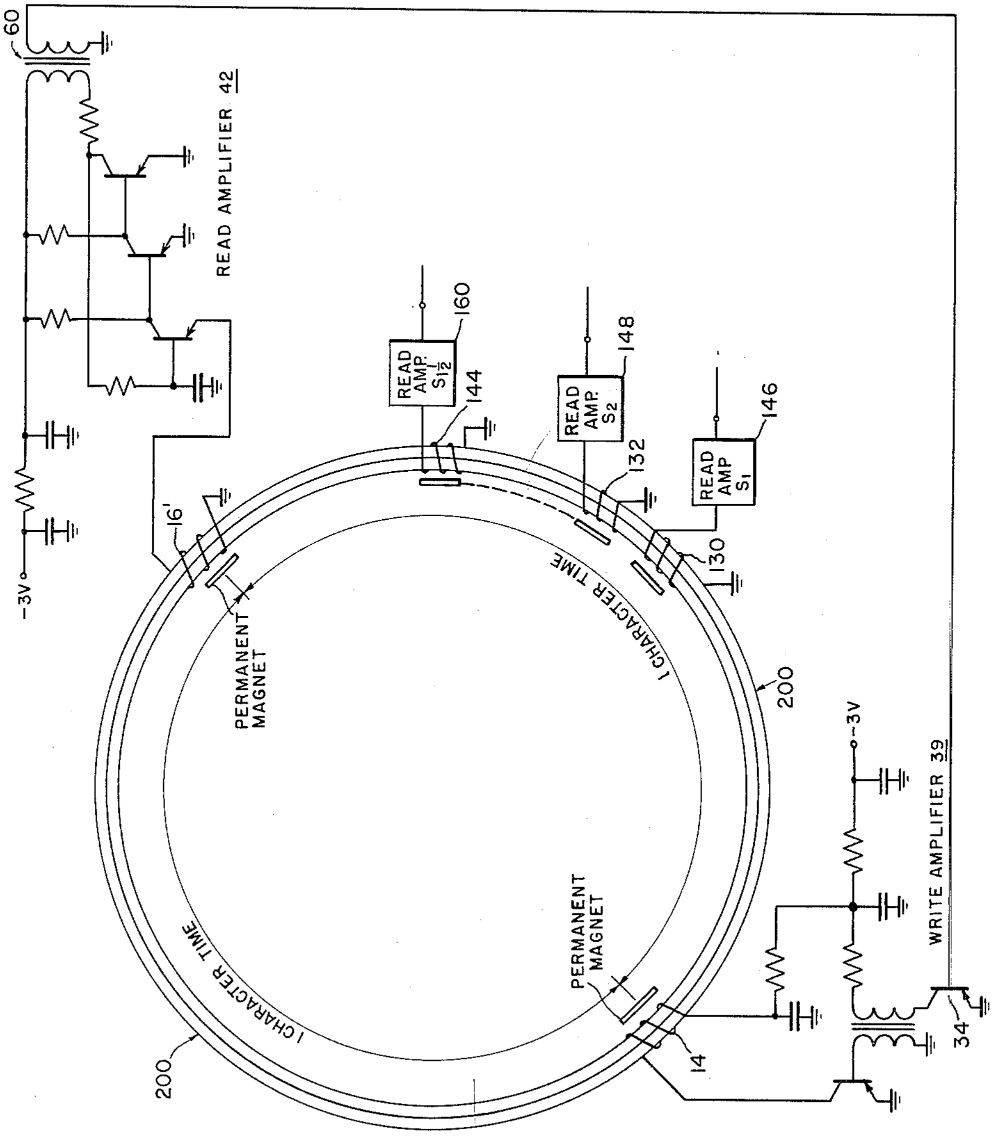

In the drawings:

FIGURE 1 is a schematic representation of one embodiment of the improved delay line assembly of the present invention which is capable of generating precisely timed clock pulses, the assembly utilizing electronic circuitry for circulating the pulses through the delay line and which circuitary includes a control system for compensating for any tendency of the timing of the pulses to change as they are circulated through the system;

FIGURE 2 is a representation of a second embodiment of the invention in which a continuous delay line is used, and in which each pulse read into the delay line is transformed into a pair of pulses travelling in opposite directions along the delay line, the pulses of each pair being utilized to maintain the system at the desired degree of accuracy.

The clock pulse generator of FIGURE 1 includes a delay line assembly 10 which may be of the magnetostrictive type or may be of any other suitable type.

The delay line assembly 10 is terminated at each of its ends by a suitable damper which is represented at 12. Each input signal introduced to the delay line produces a pair of compression pulses which travel in opposite directions. Only one of these pulses is permitted to travel down the delay line for subsequent use, the other being absorbed by one of the dampers 12. In like manner, the other damper absorbs the first compressive pulse after it has served its purpose, and prevents it from being reflected back into the line.

The assembly of FIGURE 1 includes a write transducer head 14, which in turn includes a coil surrounding a portion of the delay line 10. As shown in FIGURE 1, the write head 14 is positioned adjacent the left end of the delay line 10. The write head 14 includes a bar-type permanent magnet which is positioned parallel to its coil and to the longitudinal axis of the delay line 10. As described above, when an electric current pulse is passed through the coil of the write head 14, and when this pulse has the proper amplitude and polarity, a pair of compression pulses are produced in the delay line in response to the electric current pulse. One of the compression pulses travels along the delay line to the left in FIGURE 1 and is absorbed by the damper 12. The other pulse, however, travels down the delay line to the right in FIGURE 1 and is utilized in a manner to be described.

A first read transducer head 16 is positioned adjacent the delay line 10 in coupled relationship with the delay line. This read head includes a coil which surrounds a portion of the delay line, and it also includes an associated permanent magnet for biasing purposes. A second read transducer head 18 is also positioned in coupled relationship with the delay line 10. The read head 18 also has a coil surrounding the delay line 10 and it also has an associated permanent magnet.

In a constructed embodiment of the invention the read head 16 was displaced from the write head 14 along the delay line 10 to a distance corresponding to one character time, which in turn corresponded to seven binary digit or bit times in the particular computer in which the constructed embodiment was used. The character time for the particular computer was about 20 microseconds. Likewise, the read head 18 was displaced along the line from the read head 16 a distance corresponding to one character time.

It will be evident that after the first compression pulse produced by the write head 14, and during the operation of the generator when regularly timed compression pulses pass along the delay line 10 at intervals corresponding to one character time, a pulse passes through the coil of the read head 16 at the same time that a pulse passes through the coil of the read head 18. Both these coils cooperate to provide a reinforced pulse for re-application to the write head 14.

One terminal of the write head 14 is connected to a resistor 20 which has a resistance of 560 ohms, and this terminal is also connected to a grounded capacitor 22 having a capacity of .01 microfarad. The other terminal of the resistor 20 is connected to the junction of a 30 ohm resistor 24 and a 220 ohm resistor 26. This junction is connected by a grounded capacitor 28 which has a capacity of 1 microfarad. The resistor 24 is connected to the negative terminal of a 3 volt direct voltage source, and the resistor is also connected to a grounded capacitor 30 which has a capacity of 1 microfarad. The positive terminal of the 3 volt direct voltage source will be assumed to be connected to ground.

The resistor 26 is connected to one terminal of the primary of a transformer 32. The other terminal of the primary of the transformer is connected to the collector of a transistor 34. The transistor is a P–N–P type of transistor, and its emitter is grounded. The base of the transistor 34 is connected to an input terminal 36. The secondary of the transformer 32 has one terminal connected to the base of a transistor 38, and the other terminal of the secondary is grounded. The transistor 38 has a grounded emitter and the collector of the transistor is connected to the other terminal of the write head 14. The components described above constitute the write amplifier 39 of the system and the input terminal 36 is the input terminal for the write amplifier.

The read head 16 has one terminal connected to a terminal of the read transducer head 18. The other terminal of the read head 18 is grounded, and the other terminal of the read head 16 is connected to an input terminal 40 of a read amplifier 42.

The terminal 40 is connected to the emitter of a transistor 44. This transistor and the ones to be subsequently referred to, are all of the P–N–P type. The base of the transistor 44 is connected to a grounded 1 microfarad capacitor 46, and the collector of the transistor connects with a 3.9 kilo-ohm resistor 48. The resistor 48 is connected to a lead 50 which extends to the junction of the resistors 24 and 26.

The collector of the transistor 44 is connected to the base of a transistor 52, the emitter of the latter transistor being grounded. A 3.9 kilo-ohm resistor 54 is interposed between the collector of the transistor 52 and the lead 50. The latter collector also connects with the base of a transistor 56. The emitter of the transistor 56, like the emitter of the transistor 52, is grounded. The collector of the transistor 56 is connected to a 510 ohm resistor 58 and this resistor is connected to one terminal of the primary of a transformer 60. The other terminal of the primary of the transformer 60 is connected to the common lead 50. The transformer 60, like the transformer 32, may have a primary-to-secondary turns ratio of 50:10.

A feedback resistor 62 of 3.9 kilo-ohms is interposed between the collector of the transistor 56 and the base of the transistor 44. One terminal of the secondary of the transformer 60 is grounded and the other is connected to a lead 64 which connects with the input terminal 36 of the write amplifier 39.

The over-all length of the delay line 10 in the embodiment of the invention presently being described, is made equal, for example, to the twelve character times or one word time explained above. A read transducer head 70 is positioned in coupled relationship with the delay line 10, and this read head is displaced one word time from the write head 14. It will become evident, as the description proceeds, that the read head 70 may be displaced from the write head 14 any integral number of character times, and that the greater the integral number of character times, the more accurate the over-all system will be. The one word time displacement of the read head 70 from the write head 14 was chosen in a constructed embodiment of the invention purely from the aspect of space requirements and because sufficiently precise accuracy could be realized with that physical spacing.

The read head 70 has a grounded terminal and its other terminal connects with the input terminal 72 of a read amplifier 74. The input terminal 72 is connected to the emitter of a P–N–P transistor 76. The base of this transistor is connected to a grounded capacitor 78, the capacitor having a capacity of 1 microfarad. The collector of the transistor 76 is connected to a 3.9 kilo-ohm resistor 80 and this resistor is connected to the common lead 50. As mentioned above, the common lead connects back to the junction of the resistors 24 and 26.

The collector of the transistor 76 is also connected to the base of a P–N–P transistor 82. The emitter of the latter transistor is grounded and its collector is connected to a 3.9 kilo-ohm resistor 84. The latter resistor also is connected to the common lead 50. The collector of the transistor 82 connects with the base of a grounded emitter transistor 86. The latter transistor is also of the P–N–P type. The collector of the transistor 86 is connected to a 510 ohm resistor 88 and to a 3.9 kilo-ohm feedback resistor 90. The latter resistor is connected to the base of the transistor 76. The resistor 88 is connected to the primary of a transformer 92, the other terminal of the primary being connected to the common lead 50. One terminal of the secondary of the transformer 92 is grounded and the other is connected to the input terminal 94 of a compensating or control network designated 96. The turns ratio between the primary and secondary windings of the transformer 92 are 50:10.

The input terminal 94 of the compensating network 96 is connected to the base of a P–N–P transistor 100. The compensating network includes a second input terminal 102 which is connected to the common lead 64. This second input terminal is connected to the base of a transistor 104, the latter transistor having a grounded emitter and being of the P–N–P type. A 10 kilo-ohm resistor 106 is interposed between the collector of the transistor 104 and the common lead 50 and a similar resistor 108 is interposed between that common lead and the collector of the transistor 100. The collector of the transistor 104 is connected to the base of a transistor 110 of the P–N–P type. The emitter of the latter transistor is grounded and its collector is connected to the emitter of the transistor 100.

The collector of the transistor 100 is connected to integrating means such as a capacitor 112 which has a capacity of .01 microfarad and to a resistor 114 which has a resistance of 370 ohms. The resistor is connected to the base of a grounded emitter transistor 116 and to integrating means such as a grounded capacitor 118. The capacitor 118 has a capacity of 5 microfarads and the transistor 116 is of the P–N–P type.

The collector of the transistor 116 is connected to a 1 kilo-ohm resistor 120 which in turn is connected to the common lead 50. The collector of the transistor 116 is also connected to the base of a transistor 122. The transistor 122 is of the P–N–P type and its emitter is grounded. The collector of the transistor 122 is connected to the common lead 50.

As indicated above, when an electric current input pulse is introduced to the write head 14, a pair of compression pulses are set up in the delay line 10. Such an input pulse may be introduced, for example, to the input terminal 36 from any appropriate external source. One of the compression pulses is absorbed by the damper 12 at the left hand end of the delay line and the other travels along the delay line and through the coil of the read head 16 to induce a voltage across the read head, as described above. The pulse then travels to the read head 18 to produce a pulse in the latter read head, and it travels on down the line past an additional group of read heads, which will be described, and through the coil of the read head 70 to the damper 12 at the right hand end of the delay line, in which the compressive pulse is absorbed.

When a pulse circulation has been set up in the assembly by the input pulse introduced in the manner described above, pulses travel down the delay line 10 at intervals corresponding to one character time in the particular embodiment under consideration. This means that a pulse passes through the coil of the read head 16 once for each character time and a preceding pulse simultaneously passes through the coil of the read head 18 each time the pulse passes through the coil of the read head 16. Also, another preceding pulse passes through the coil of the read head 70 each time the pulses pass through the coils of the read heads 16 and 18.

The read heads 16 and 18 cooperate to assure that a pulse will be produced to maintain the circulation even though a pulse may be inadvertently lost or not read by one of the two read heads.

The output pulses produced by the read heads 16 and 18 are introduced to the input terminal 40 of the read amplifier 42. The read amplifier is a typical transistorized stable feedback amplifier and it introduces amplified electric pulses on the lead 64 for application to the input terminal 36 of the write amplifier 39. Each of these amplified pulses is produced in response to each reinforced pulse produced across the read heads 16 and 18. The amplified pulse introduced to the input terminal 36 of the write amplifier 39 is amplified by the circuitry of the write amplifier and is introduced to the write head 14 to be circulated through the delay line 10. In this manner a pulse circulation is maintained with an interval of one character time existing between each successive pulse introduced to the delay line 10.

As mentioned above, the delay line itself has highly stable characteristics and serves to maintain the desired precision in timing between successive pulses. However, the amplifiers 42 and 39 are subject to some drift and this drift is sufficient to shift the timing of the pulses out of the required tolerances of the utilizing means. Such a shift is prevented by the circuitry 96, as will now be described.

The amplified pulse produced by the read amplifier 42 is also introduced to the input terminal 102 of the compensating circuitry 96. This pulse is inverted by the inverter circuit formed by the circuit of the transistor 104 and an inverted pulse is introduced to the base of the transistor 110. The transistor 110 is therefore conditioned for conduction at all times except during the occurrence of the pulse from the read amplifier 42. Such a pulse from the read amplifier 42 has a positive polarity and causes the transistor 104 to conduct. This reduces the potential on the base of the transistor 110 to zero, so that this transistor is rendered nonconductive. The pulses produced by the read amplifier 42 are of the order of 2 microseconds long in the constructed embodiment of the invention.

Simultaneously with the production of pulses by the read amplifier 42, spaced apart by one character time, the read head 70 also produces pulses which are spaced apart by one character time. The latter pulses are amplified by the read amplifier 74 which produces amplified pulses having a duration of the order of 1 microsecond in the constructed embodiment. These latter pulses have a positive polarity and they are applied to the input terminal 94 of the circuitry 96 and through that terminal to the base of the transistor 100. Now, if the timing of the system is within the desired limits, the 2 microsecond pulses introduced to the input terminal 102 from the read amplifier 42 will occur in time coincidence with the 1 microsecond pulse introduced to the input terminal 94 from the read amplifier 74. The latter pulse will tend to make the transistor 100 conductive; however, at the same interval the transistor 110 will be nonconductive, so that it will have no effect.

Under the above circumstances, the charge on the capacitors 112 and 118 will be such that a pre-determined current flows through the transistor 116 to cause the transistor 122 to place a particular load on the power supply formed by the resistor 24 and the capacitors 30 and 28. This causes the power supply to supply a particular direct current exciting voltage to the various amplifiers and the delay through the read amplifier and write amplifier is a function of that voltage. As the voltage decreases the delay decreases to increase the repetition frequency of the pulses.

Should the repetition frequency of the pulses tend to change, however, a pulse introduced to the input terminal 94 would be displaced in timing with respect to a pulse introduced to the input terminal 102. This means that the pulse at the input terminal 94 would have a portion occurring when no corresponding pulse appears at the input terminal 102. During such an occasion the transistor 110 is conductive so that the portion of the pulse introduced to the input terminal 94 causes a brief current flow through the transistor 100.

The interval of the current flow through the transistor 100 depends, of course, on the amount of displacement of the pulse at the terminal 94 from the pulse at the terminal 102. The resulting current flow through the transistor 100 controls the charge on the capacitor 118, which, in turn, controls the conductivity of the transistor 116. This, in turn, controls the loading effect of the transistor 122 on the power supply so that the direct voltage level of the power supply is corrected. The correction of the direct voltage level is in a direction to compensate for the tendency of the timing between successive pulses to change, so that the original timing is restored.

In actual practice the pulses introduced to the input terminals 94 and 102 of the compensating circuitry 96 are made to overlap slightly so that a current flow always occurs through the transistors 100 and 110 for each occurrence of these pulses. It will be appreciated that the amount of current flow will depend on the amount of displacement of the pulses and that this current flow increases or decreases, depending upon the direction of shift of the timing between successive pulses. This increase or decrease of the current flow produces corresponding variations in the charge on the capacitor 118, and the charge in turn controls the loading of the transistor 122 on the power supply to correct the condition.

The output signals from the generator of FIGURE 1 are derived from a plurality of additional read transducer heads which are designated 130, 132, 134, 136, 138, 140, 142 and 144. These read heads need have no particular spacing from the pulse-circulating transducer heads described above. In the illustrated embodiment, the seven read heads 130, 132, 134, 136, 138 and 140 are positioned with respect to one another along the delay line 10 so that the pulse passing through them during each character time will cause successive ones of these heads to generate pulses which are displaced from one another by one binary digit time. The read head 144 is displaced from the read head 142 by a distance corresponding to an interval of one and one-half binary digit times, and this head provides a special timing signal that is required for the particular computer with which the constructed embodiment of the invention was used.

The read heads 130, 132, 134, 136, 138, 140, 142 and 144 are connected to respective amplifiers, 146, 148, 150, 152, 154, 156, 158 and 160. Only the amplifier 146 is shown in circuit detail, and it will be observed that this amplifier is similar in its construction to the read amplifiers 42 and 74. The other read amplifiers 148, 150, 152, 154, 156, 158 and 160 may be similarly constructed.

The output terminals of the read amplifiers 146, 148, 150, 152, 154, 156 and 158 are all connected to an "or" network 162. This "or" network, as is well understood in the computer art, is a gate network which provides an output signal which varies from zero to one, each time that any of its variable input signals changes in the same manner. Therefore, the "or" network 162 provides an output signal "N" which varies from zero to one for every bit time during each character time, and the output signal "N" constitutes an appropriate clock signal for use in any appropriate utiliztaion means. It will be observed that the output signals from the system of FIGURE 1 are derived from the read transducer heads of the additional group so that the load placed on the system has no effect whatever upon the accuracy with which the pulses are circulated through the line.

The additional read head 130 is shown displaced a distance corresponding to three character times from the read head 18 in FIGURE 1. This is merely for physical requirements in the constructed embodiment of the invention.

The embodiment of FIGURE 2 utilizes a delay line 200 which is formed into a continuous loop and which may have the same characteristics as the delay line 10 of FIGURE 1. The assembly of FIGURE 2 uses many components which are identical to those used in the assembly of FIGURE 1, and these components are designated by the same numerals in both figures. The write transducer head 14 is positioned in coupled relationship with the delay line 200 in FIGURE 2 and the write head is excited by the write amplifier 39, as described above. A single read head designated 16' is positioned diametrically opposite the read head 14. The length of the delay line 200 is such that the distance from the write head 14 to the read head 16' in either direction corresponds to one character time. The read head 16' is connected to the read amplifier 42, and the output transformer 60 of the read amplifier 42 is connected back to the transistor 34 of the write amplifier 39.

The components and circuits referred to above may have the same composition and parameters as those bearing the same numerals in FIGURE 1, and previously described in conjunction with that figure.

The additional group of read heads 130, 132, 134, 136, 138, 140, 142, and 144 are positioned in coupled relationship with the delay line 200 in the position illustrated in FIGURE 2.

These read heads, as in the previous embodiment, are spaced apart a distance corresponding to one digit time in the particular embodiment being described.

In the embodiment of FIGURE 2 each input electric pulse to the write head 14 causes a pair of compression pulses to travel in opposite directions around the delay line 200. The read head 16' is positioned at the precise point that these pulses cross in their travel. The read head 16' is constructed to respond to the joint effect of the two pulses passing under its coil to produce a reinforced pulse whose leading edge represents a timing effect contributed by both of the pulses of the pair traveling through the delay line 200.

The reinforced pulse from the read head 16' is amplified in the read amplifier 42 and applied to the write amplifier 39 to maintain the circulation of pulses through the delay line. Any tendency for the timing of the pulses to vary changes the exact point at which they meet adjacent the read head 16'. This slight change varies the composition of the reinforced pulse so that its leading edge appears a little ahead or a little behind the previous interval depending upon the direction of change in the timing of the pair of pulses. This change in the composite pulse changes the timing slightly with which the pulses are reinforced when next they pass under the write head 14, which produces a compensating effect on the timing of the pulses. Therefore, the two compression pulses travel continuously in opposite directions around the delay line 20 under the read head 16' where they are read to produce a reinforced pulse, and then under the write head 14, where the compressive pulses are reinforced with the proper timing.

A pulse will pass under the read heads 130, 132 . . . 144 once each character time, so that the desired output may be realized. The invention provides, therefore, an improved clock generator system and apparatus which is extremely precise in its operation, and which is rugged and reliable in its construction. Moreover, the improved clock generator of the present invention requires relatively simple components, and is therefore relatively economical to construct.

We claim:

1. Signal generating means for producing a train of regularly timed recurrent electric pulses, said generating means including: a magnetostrictive delay line for imparting a pre-determined time delay to signal pulses introduced thereto and including a first section and a second section for simultaneously carrying respective ones of the signal pulses during the operation of the generating means, input means including write head transducer means coupled to said magnetostrictive delay line and responsive to an electric input pulse for introducing a signal pulse to said delay line for passage through said first and second sections thereof, output means including read head transducer means coupled to said first section of said delay line and to said second section of said delay line and displaced from said write head transducer means, said read head transducer means being responsive to the signal pulse traveling through said first and second sections of said delay line for producting an electric output pulse having a pre-determined time relation with respect to the electric input pulse as determined by the time delays of said signal pulse in said first and second sections of said delay line and having a timing established by the combined effect of the signal pulse traveling through said first section and through said second section, a recirculating amplifier circuit coupled to said read head transducer means and to said write head transducer means for introducing a train of circulating pulses to said magnetostrictive delay line, at least one additional output means coupled to said delay line including at least one additional read head transducer means displaced a pre-determined distance along said delay line from said write head transducer means, and output circuit means coupled to said additional read head transducer means and responsive to said circulating signal pulses for producing at least one train of regularly timed electric output pulses.

2. Signal generating means for producing a train of regularly timed recurrent electric pulses, said generating means including: delay line for imparting a pre-determined time delay to signal pulses introduced thereto, said delay line including a first section and a second section for simultaneously carrying respective ones of the signal pulses during the operation of the generating means, input means coupled to said delay line and responsive to an electric input pulse for introducing a signal pulse to said delay line for passage through said first and second sections of said delay line, output means coupled to said first section of said delay line and to said second section of said delay line and displaced from said input means and responsive to the signal pulse traveling through said first section and through said second section for producing an electric output pulse having a pre-determined time relation with respect to the electric input pulse as determined by the time delay of said signal pulse in said first and said second sections of said delay line and having a timing established by the combined effect of the signal pulse traveling through said first section and through said second section, a recirculating circuit exhibiting variable delay characteristics coupled to said output means and to said input means for recurrently introducing said electric output pulses from said output means to said input means so as to introduce a train of circulating pulses to said delay line, control means coupled to said recirculating circuit for controlling the time delay of the electric pulses passing therethrough to compensate for any variation in the timing between successive pulses circulating through said delay line, at least one additional output means coupled to said delay line displaced a pre-determined distance along said delay line from said input means, and output circuit means coupled to said additional output means and responsive to said circulating signal pulses for providing at least one train of regularly timed electric output pulses.

3. Signal generating means for producing a train of regularly timed recurrent electric pulses, said generating means including: a delay line for imparting a pre-determined time delay to signal pulses introduced thereto and including a first section and a second section for simultaneously carrying respective ones of the signal pulses during the operation of the generating means, input means coupled to said delay line and responsive to an electric input pulse for introducing a signal pulse to said delay line for passage through said first and second sections thereof, output means coupled to said first and second sections of said delay line, and displaced from said input means, said output means being responsive to the signal pulse traveling through said first and second sections of said delay line for producing an electric output pulse having a pre-determined time relation with respect to the electric input pulse as determined by the time delays of said signal pulse in said first and second sections of said delay line and having a timing established by the combined effect of the signal pulse traveling through said first section and through said second section, a recirculating circuit coupled to said output means and to said input means for recurrently introducing said electric output pulse from said output means to said input means so as to introduce a train of circulating signal pulses to said delay line, said recirculating circuit including an amplifier for introducing said train of circulating pulses to said delay line with a controllable time delay, means for introducing an exciting potential to said amplifier, and control means coupled to said first-mentioned output means for comparing successive pulses passing through said delay line to produce a control signal which varies in accordance with changes in the timing of such pulses, and means for introducing said control signal to said introducing means to vary the exciting potential introduced to said amplifier in accordance with variations in said control signal so as to control the time delay of the electric pulses passing through the amplifier and compensate for any variation in the timing between successive pulses circulating through said delay line, at least one additional output means coupled to said delay line and displaced a pre-determined distance along said delay line from said input means, and output circuit means coupled to said additional output means for producing at least one train of regularly timed electric output pulses.

4. Signal generating means for producing a train of regularly timed recurrent electric pulses, said generating means including: a magnetostrictive delay line for imparting a predetermined time delay to signal pulses introduced thereto, said delay line including a first section and a second section for simultaneously carrying respective ones of the signal pulses during the operation of the generating means, input means including write head transducer means coupled to said magnetostrictive delay line and responsive to an electric input pulse for introducing a signal pulse to said delay line for passage through said first and second sections of said delay line, output means including read head transducer means coupled to said first section of said delay line and to said second section of said delay line and displaced from said write head transducer means, said read head transducer means being responsive to the signal pulse traveling through said first section and through said second section for producing an electric output pulse, said output pulse having a pre-determined time relation with respect to the electric input pulse as determined by the time delays of said signal pulse in said first and second sections of said delay line and having a timing established by the combined effect of the signal pulse traveling through said first section and through said second section, a recirculating amplifier circuit coupled to said read head transducer and to said write head transducer for recurrently introducing said electric output pulses from said read head transducer to said write head transducer with a controllable time delay so as to introduce a train of circulating pulses to said delay line, means for introducing an exciting potential to said recirculating amplifier circuit, a control circuit coupled to said output means for comparing successive pulses passing through said delay line to produce a control signal which varies in accordance with changes in the timing of such pulses, means for introducing said control signal to said introducing means to vary the exciting potential introduced thereby to said amplifier in accordance with variations in said control signal so as to control the time delay of the electric pulses passing through the amplifier and compensate for any variation in the timing between successive pulses circulated through said delay line, at least one additional read head transducer displaced a pre-determined distance along said delay line from said write head transducer means and output circuit means coupled to said additional read head transducer and responsive to said circulating signal pulses for producing at least one train of regularly timed electric output pulses.

5. The combination defined in claim 4 and in which said control circuit includes capacitor means, circuit means coupled to said capacitor means for producing a charge therein dependent upon the time relation of the successive pulses compared in said control circuit, and current control member coupled to said capacitor means for producing a variable loading effect on said introducing means in accordance with variations in the charge on said capacitor means to control the value of the exciting potential introduced thereby to the amplifier.

6. The combination defined in claim 4 and which includes a plurality of additional output means including a corresponding plurality of additional read head transducers coupled to said delay line and displaced pre-determined distances along said delay line from said write head transducer means and spaced from one another by respective displacements corresponding to pre-determined time intervals, so that each of said additional read head transducers generates an additional output pulse for each of said circulating pulses and with the additional output pulses having a pre-determined time relation with one another corresponding to respective ones of said pre-determined time intervals.

References Cited in the file of this patent

UNITED STATES PATENTS

| | | |
|---|---|---|
| 2,558,249 | Hewlett et al. | June 26, 1951 |
| 2,616,047 | Boothroyd | Oct. 28, 1952 |
| 2,616,049 | Bailey | Oct. 28, 1952 |
| 2,835,807 | Lubkin | May 20, 1958 |
| 2,836,723 | Erath | May 27, 1958 |
| 2,876,352 | Schneider | Mar. 3, 1959 |